May 31, 1938.    F. J. BACHMANN    2,119,001
HYDRAULIC BRAKE EQUALIZER
Filed Sept. 4, 1936
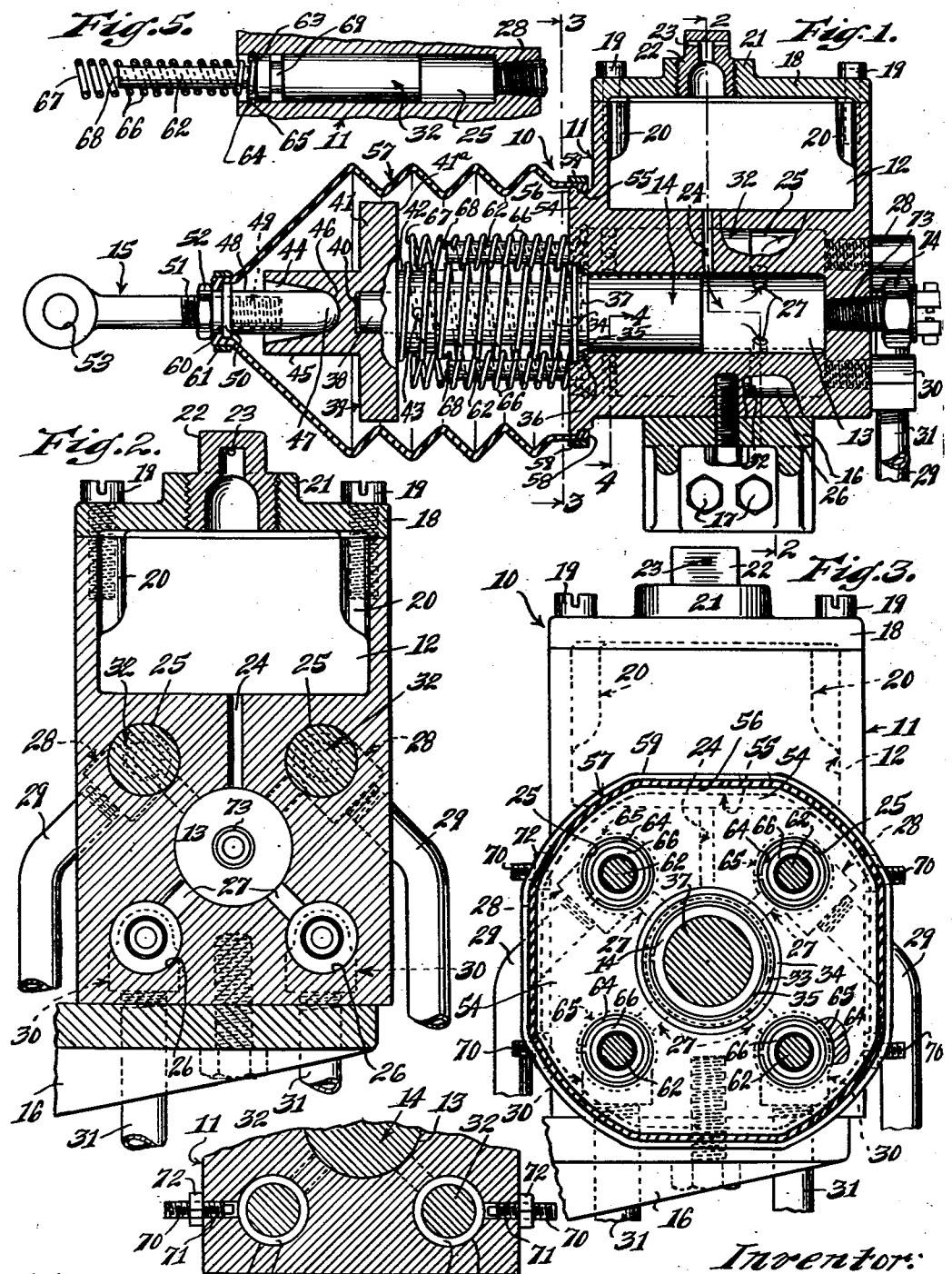
Witnesses:
E. E. Wessels
Hazel R. Severson
Inventor:
Frank J. Bachmann,
By Joshua R H Potts
his Attorney.

Patented May 31, 1938

2,119,001

UNITED STATES PATENT OFFICE 2,119,001

HYDRAULIC BRAKE EQUALIZER

Frank J. Bachmann, Chicago, Ill.

Application September 4, 1936, Serial No. 99,497

7 Claims. (Cl. 303—84)

This invention relates to brake mechanism for motor vehicles and the like and more especially to means for actuating and equalizing hydraulic brakes. Hydraulic brakes for motor vehicles as constructed heretofore possess an important inherent weakness. A complete failure of the brakes often results because of a leak in one of the pipe lines between the actuating means or master cylinder and its associated operating mechanism on the wheel. It is to overcome this dangerous and objectionable condition that my present invention has been developed, as will be clear from the following specification.

It is therefore a general object of the invention to provide a simple, practical, and reliable brake actuating mechanism of the character described.

Another object is to provide in such a brake mechanism means for automatically isolating any particular brake wheel actuating mechanism that has become inoperative because of a leak in the system leading to that brake, and at the same time maintaining complete operativeness and balance of the remaining wheel brakes.

Other related objects and advantages will appear and be brought out more fully in the following description, reference being had to the accompanying drawing, wherein:

Fig. 1 is an elevation in central section of a preferred embodiment of my invention;

Fig. 2 is a cross-sectional elevation taken along the line 2—2 of Fig. 1;

Fig. 3 is a similar view taken along the line 3—3 of Fig. 1;

Fig. 4 is a fragmentary sectional view taken along the line 4—4 of Fig. 1; and

Fig. 5 is a fragmentary view illustrating one of the valves comprising an important feature of the invention.

Referring more particularly to the drawing, I show hydraulic brake equalizing and actuating mechanism generally by the numeral 10, which consists essentially of a metallic housing 11 preferably of cast iron or equivalent material, in the upper portion of which is a reservoir 12 for the operating fluid which is usually a specially prepared oil. In the lower portion of the housing I have provided a main cylinder 13 open at one end in which is adapted to reciprocate a master piston 14, the clearance between the piston and the cylinder being very small in order to prevent the leakage of the liquid past the walls of the piston. It may be found advisable under certain circumstances in order to prevent leakage of the liquid past the piston 14 and the pistons 32 as hereinafter described to provide a packing ring. However, as this is considered a matter to be determined as met in practice, the details of which are well understood by automotive engineers, I have not attempted to show any particular form of such a seal, but it will be understood that such a seal may be employed if found desirable or necessary.

The piston 14 is actuated or reciprocated by an adjustable push rod 15 connected to the usual motor vehicle brake pedal, the details of which arrangement are well known to those skilled in the art and not shown further herein. A bracket 16 supports the housing 11, being suitably secured thereto by bolts or otherwise, and is secured to a convenient portion of the frame of the motor vehicle by mounting bolts 17. A suitable cover 18 is provided for the reservoir 12 to which it is secured by bolts 19 threaded into bosses 20 in the upper part of the housing 11. The cover 18 has a shouldered filling aperture 21 closed by a threaded square head plug 22 suitably provided with ventilating passages 23. An inlet port 24 leads from the reservoir 12 to cylinder 13 whereby the cylinder is normally kept full of liquid from the reservoir 12, the normal or inoperative position of the piston 14 being in the position shown in Fig. 1. A pair of cylinders 25 are located in the upper portion of the housing 11 and in a manner similar to cylinder 13 have an open end. A similar pair of open end cylinders 26 are located in the lower portion of the housing 11, the cylinders 25 and 26 each having a communicating passageway or port 27 connecting them with the master or main cylinder 13.

Elbow couplings 28 connect the upper cylinders 25 with pipes 29 which lead to two of the motor vehicle wheel brakes and preferably to the front wheel brakes for a reason which will be apparent hereinafter. Similarly elbow couplings 30 connect cylinders 26 with pipes 31 leading to the remaining two wheels of the vehicle. In each of the cylinders 25 and 26 is located an equalizing piston or valve 32, the pistons being adapted to reciprocate in the cylinders in a manner similar to piston 14. The cylinders 25 and 26 together with ports 27 provide passageways between the master cylinder 13 and the pipes 29 and 31, and together with pistons 32 comprise shut-off valve mechanism for these pipes. A circular recess or shoulder 33 is provided in the housing 11 at the open end of cylinder 13 and forms a seat for one end of a spring 34. A resilient snap ring 35 is retained by its resiliency in a semi-circular groove 36 adjacent the open end of cylinder 13 and serves as a stop for the piston 14, as will be clear from Fig. 1. The piston 14 has a reduced portion 37 and a further reduced end portion 38, the latter being secured to a circular flange member 39 having a bore 40 adapted to receive the reduced portion 38. The member 39 has a flange ring 41 having a face 41a adapted for a function to be described hereinbelow. A hub 42 is also provided on member 39 and a locking pin 43 secures the piston member 14 to flange member 39. In the opposite end of member 39 a conical bore 44 is formed in an extension 45 of the member 39, bore 44 having a rounded seat 46 adapted for engagement with the rounded end 47 of a push rod extension member 48. The member 48 has a threaded bore 49 and a flange 50, the bore 49 having a threaded attachment to a threaded portion 51 of push rod 15, a suitable locking nut 52 being provided to prevent loosening of these parts. The rod 15 has a pivoted end 53 for engagement with the operating arm of the brake pedal.

A neck 54 is formed on the housing 11 and has a groove 55 and a flange 56 adapted for the attachment of one end of a tubular flexible boot 57, the terminal edge of the boot having a bead 58 adapted to be retained in the groove 55, and a locking ring 59 may be employed to secure the bead 58 in groove 55. A similar beaded neck 60 is formed at the opposite end of the boot 57, a similar locking ring 61 being provided to secure the neck 60 to the flange 50.

The pistons 32, one of which is shown in detail in Fig. 5, each have a reduced portion 62 and a shoulder 63, the latter being adapted to secure the piston against removal from the cylinder 25 with a snap ring 64 located in a semi-circular groove 65 in the cylinder wall. A coil spring 66 is retained in position around the reduced portion 62 of each piston 32, one end of the spring 66 being against the shoulder 63, the spring having a free end 67 which in normal position is spaced a short distance from the face 41a of the ring 41. The reduced portion 62 of each piston 32 has an end face 68. Each piston 32 is preferably provided with a circular groove 69 in which a locking screw 70 is adapted to be advanced when under certain circumstances it is desired to lock the pistons 32. Each screw 70 is secured in a threaded bore 71 in the housing 11, lock nuts 72 being employed to hold the screws 70 in retracted position as shown in Fig. 4 during normal actuation of the brake mechanism. The pistons 32 are locked by the screws 70 when it is desired to fill the pipe lines 29 and 31 initially, after a necessary bleeding of the pipes during servicing, or after damage to any of the pipes or brake mechanism, as will be apparent hereinafter. A threaded bore 73 may be provided in the end wall of the cylinder 13 for the reception of the well-known stop light switch 74.

The operation of my invention is as follows: Assuming the pipes 29 and 31, the cylinders 13, 25, and 26, and reservoir 12 to be filled with the proper actuating oil or other fluid, the brake pedal upon being depressed will actuate push rod 15 to the right as shown in Fig. 1, forcing the master piston 14 to the right a short movement which will carry its free end beyond inlet port 24, further movement of which will develop a pressure in cylinders 13, 25, and 26, and pipes 29 and 31, thus actuating the brakes on the wheels of a motor vehicle, the liquid from cylinder 13 passing to cylinders 25 and 26 through passageways or ports 27. The initial movement of the pedal and push rod 15 will create this pressure in the cylinders 25 and 26 which pressure will operate to maintain the pistons 32 in the left end of cylinders 25 and 26 or against the stop rings 64. Subsequent forward movement of the pedal and push rod 15 will cause face 41a of the flange ring 41 to press against free ends 67 of the springs 66, the other ends of which will press against the shoulders 33 of pistons 32. This movement would have a tendency to move the pistons 32 to the right, which movement, however, is prevented inasmuch as the spring tension of the springs 66 is insufficient to overcome the fluid pressure against the opposite ends of the pistons 32.

If, however, any one of the pipes 29 or 31 has developed a leak permitting the removal of the fluid therein, there will not be sufficient pressure developed in its associated cylinder 25 or 26 to retain piston 32 in its initial position, and the movement of rod 15 and flange ring 41 upon reaching the end 67 of the spring 66 will now cause the piston 32 associated with the faulty pipe to be shifted to the right, a small movement of which will carry the end past its associated port 27, thus shutting off the pipe and permitting the pressure of the master cylinder to be maintained in the remaining pipe lines, it being understood that this pressure will be equalized in these pipes by ports 27, and the actuation of the brakes associated therewith will occur. The piston or pistons 32 which have thus been shifted to the right upon the failure of such faulty pipe lines 29 or 31 will thereafter be maintained in position to keep their respective ports 27 closed during subsequent operation of the brakes and until the faulty line has been repaired, there being no way in which said pistons can be returned to the normal position except the actual return thereof by a service man by a proper tool such as a pair of pliers applied to the reduced portion 62 or by the removal of one of the fittings 28 or 30 and a rod or screwdriver used at the right end.

In the event that the fluid should have escaped from the master cylinder 13 but sufficient fluid was retained in one or more of the small cylinders, for instance the lower cylinders 26, the brakes associated with the cylinders 26 can be operated by sufficiently great movement of the push rod 15, initial movement of which would close off ports 27 and engagement would occur between the ends 68 of the associated pistons 32 and the face 41a of flange ring 41. This would enable the pedal pressure to positively move the said pistons 32 to create sufficient presure in the cylinders 26 to actuate the brakes connected with the pipes 31 and thus sufficient brake mechanism would be employed on the motor vehicle to prevent an accident. It will be understood that such braking action would ordinarily be indicated to the driver in time for necessary repairs to be made.

For the reasons just pronounced the brake cylinders 25 and 26 have been preferably arranged around the master cylinder 13. However, commercial practice may show that it is satisfactory to have them all arranged below the master cylinder 13, it being understood that the embodiment shown is illustrative of my invention and not intended to limit its mode of application.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. Hydraulic brake actuating and equalizing means as described, comprising a liquid reservoir, a pressure cylinder, a piston in said cylinder adapted to create said pressure pedal actuated means engaging said piston, a plurality of pipes each connecting said cylinder and one of the brakes, said pipes adapted to retain liquid therein, whereby to transmit said pressure to said brakes, and means adapted upon the failure of any one of said pipes to transmit said pressure to close off said pipe from said cylinder, said means including a valve adapted to be kept inoperative by normal pressure in said pipe and adapted to be operated upon subnormal pressure occurring in said pipe said valve adapted to be engaged by and actuated by said pedal actuated means.

2. Hydraulic brake actuating and equalizing means as described, comprising a housing, a cylinder, a plurality of pipes each connecting said cylinder to one of the brakes, a reservoir adapted to keep said cylinder and pipes filled with actuating fluid, a pedal actuated piston adapted to create pressure in said cylinder and pipes, a passageway in said housing for each of said pipes to said cylinder, and a pedal actuated valve in each of said passageways adapted to close its respective passageway upon the inability of its associated pipe to maintain said pressure.

3. Hydraulic brake actuating and equalizing means as described, comprising a housing, a cylinder, a plurality of pipes each connecting said cylinder to one of the brakes, a reservoir adapted to keep said cylinder and pipes filled with actuating fluid, a pedal actuated piston adapted to create pressure in said cylinder and pipes, a passageway in said housing for each of said pipes to said cylinder, and a pedal actuated valve in each of said passageways adapted to close its respective passageway upon the inability of its associated pipe to maintain said pressure, said valves adapted to be normally retained in inoperative position by said pressure.

4. Hydraulic brake actuating and equalizing means as described, comprising a housing having a liquid reservoir and a pressure cylinder, a piston in said cylinder adapted to create said pressure, pedal engaging and actuating means for said piston, a plurality of valve cylinders in said housing, a passageway between each said valve cylinder and said pressure cylinder, a plunger valve in each said valve cylinder adapted when actuated to close off its said passageway to said pressure cylinder, each said valve having a stem adapted to engage said pedal actuating means, and a pipe connecting each said valve cylinder and one of the brakes, said valves each being adapted to be normally held open by said pressure, and to be actuated by said pedal actuating means to close off its said passageway upon the inability of its associated pipe to maintain said pressure.

5. Hydraulic brake actuating and equalizing means as described, comprising a housing having a liquid reservoir and a pressure cylinder, a piston in said cylinder adapted to create said pressure, pedal engaging and actuating means for said piston, a plurality of valve cylinders in said housing, a passageway between each said valve cylinder and said pressure cylinder, a plunger valve in each said valve cylinder adapted when actuated to close off its said passageway to said pressure cylinder, each said valve having a stem and a spring adapted to engage said pedal actuating means, and a pipe connecting each said valve cylinder and one of the brakes, said valves each being adapted to be normally held open by said pressure, and to be actuated by said pedal actuating means and spring to close off its said passageway upon the inability of its associated pipe to maintain said pressure.

6. Hydraulic brake actuating and equalizing means as described, comprising a housing having a liquid reservoir and a pressure cylinder, a piston in said cylinder adapted to create said pressure, pedal engaging and actuating means for said piston, a plurality of valve cylinders in said housing, a passageway between each said valve cylinder and said pressure cylinder, a plunger valve in each said valve cylinder adapted when actuated to close off its said passageway to said pressure cylinder, each said valve having a stem adapted to engage said pedal actuating means, and a pipe connecting each said valve cylinder and one of the brakes, said valves each being adapted to be normally held open by said pressure, and to be actuated by said pedal actuating means to close off its said passageway to said pressure cylinder upon the inability of said pressure cylinder to maintain its said pressure.

7. Hydraulic brake actuating and equalizing means as described, comprising a housing having a liquid reservoir and a pressure cylinder, a piston in said cylinder adapted to create said pressure, pedal engaging and actuating means for said piston, a plurality of valve cylinders in said housing, a passageway between each said valve cylinder and said pressure cylinder, a plunger valve in each said valve cylinder adapted when actuated to close off its said passageway to said pressure cylinder, each said valve having a stem and a spring adapted to engage said pedal actuating means, and a pipe connecting each said valve cylinder and one of the brakes, said valves each being adapted to be normally held open by said pressure, and to be actuated by said pedal actuating means and spring to close off its said passageway to said pressure cylinder upon the inability of said pressure cylinder to maintain its said pressure.

FRANK J. BACHMANN.